(12) United States Patent
Bennett et al.

(10) Patent No.: US 7,891,322 B2
(45) Date of Patent: Feb. 22, 2011

(54) DOG HARNESS

(75) Inventors: Sharon E. Bennett, Midlothian, VA (US); Charles D. Mann, Marine-on-St.-Croix, MN (US); Robert A. Anderson, Falcon Heights, MN (US)

(73) Assignee: Premier Pet Products, LLC, Midlothian, VA (US)

( * ) Notice: Subject to any disclaimer, the term of this patent is extended or adjusted under 35 U.S.C. 154(b) by 647 days.

(21) Appl. No.: 11/271,085

(22) Filed: Nov. 12, 2005

(65) Prior Publication Data

US 2006/0102102 A1 May 18, 2006

Related U.S. Application Data

(60) Provisional application No. 60/627,739, filed on Nov. 12, 2004.

(51) Int. Cl.
*A01K 27/00* (2006.01)
(52) U.S. Cl. .......................... 119/856; 119/863
(58) Field of Classification Search ............... 119/725, 119/814, 818, 819, 856, 858, 863, 864, 865
See application file for complete search history.

(56) References Cited

U.S. PATENT DOCUMENTS

| | | | | |
|---|---|---|---|---|
| 378,153 A | * | 2/1888 | Tiffany | 119/724 |
| 597,317 A | * | 1/1898 | Ellsworth | 119/818 |
| 1,685,435 A | * | 9/1928 | Philbrick | 119/856 |
| 1,800,421 A | | 4/1931 | Wickersham et al. | |
| 2,026,383 A | * | 12/1935 | Gyulay | 119/863 |
| 2,605,744 A | | 8/1952 | Urbanski | |
| 2,817,393 A | | 12/1957 | Mitchell | |
| 2,826,172 A | * | 3/1958 | Buckle et. al. | 119/792 |
| 3,310,034 A | | 3/1967 | Hisheart | |
| 3,768,445 A | * | 10/1973 | Sorrels | 119/856 |
| D245,350 S | | 8/1977 | Geary | |
| 4,060,056 A | * | 11/1977 | Maietta | 119/793 |
| 4,106,266 A | | 8/1978 | Hibbert | |
| 4,337,610 A | | 7/1982 | Taylor | |
| 4,483,275 A | | 11/1984 | De Groot | |

(Continued)

FOREIGN PATENT DOCUMENTS

DE 3837507 1/1990

(Continued)

OTHER PUBLICATIONS

Miller, Pat; A New Sense-ation, The Whole Dog Journal vol. 6 No. 10 (Oct. 2003) pp. 22-23.*

*Primary Examiner*—David J Parsley
(74) *Attorney, Agent, or Firm*—Hovey Williams LLP

(57) ABSTRACT

A dog harness is comprised of a torso strap positioned across the lower shoulders of a dog, connected to a chest strap passing around the chest of a dog, and a shoulder strap passing over the back of a dog. The chest strap is provided with a limited slip loop. A leash connector is fixed to the limited slip loop. When a leash is attached to the leash connector, a directional pull on the leash causes the leash connector to slide in the direction of the pull, pulling the limited slip loop to the side and moving the pull off the center of the dog's chest, thus decreasing the opposition reflex.

8 Claims, 6 Drawing Sheets

U.S. PATENT DOCUMENTS

| | | | |
|---|---|---|---|
| 4,495,753 A | 1/1985 | Simpson | |
| 4,530,309 A | 7/1985 | Collins | |
| 4,553,633 A | 11/1985 | Armstrong et al. | |
| 4,559,906 A * | 12/1985 | Smith | 119/865 |
| 4,565,055 A | 1/1986 | Simpson | |
| 4,566,255 A | 1/1986 | DeGroot | |
| 4,676,198 A * | 6/1987 | Murray | 119/771 |
| 4,964,369 A | 10/1990 | Sporn | |
| 4,969,419 A | 11/1990 | Fong | |
| 5,094,062 A | 3/1992 | Clark | |
| 5,146,875 A | 9/1992 | Bolt | |
| 5,154,660 A | 10/1992 | Snyder et al. | |
| 5,199,383 A * | 4/1993 | Lagana | 119/858 |
| 5,247,905 A | 9/1993 | Arakawa | |
| 5,325,819 A | 7/1994 | Krauss | |
| 5,329,885 A * | 7/1994 | Sporn | 119/864 |
| 5,335,627 A | 8/1994 | Bandimere | |
| 5,383,426 A * | 1/1995 | Krauss | 119/793 |
| 5,471,953 A * | 12/1995 | Sporn | 119/792 |
| 5,485,810 A | 1/1996 | Sporn | |
| 5,503,113 A | 4/1996 | Knight | |
| 5,511,515 A * | 4/1996 | Brown et al. | 119/771 |
| 5,529,018 A | 6/1996 | Butts | |
| 5,611,298 A | 3/1997 | Sporn | |
| 5,676,093 A * | 10/1997 | Sporn | 119/792 |
| 5,690,059 A | 11/1997 | Woods | |
| 5,706,764 A | 1/1998 | Irbinskas | |
| 5,713,308 A | 2/1998 | Holt, Jr. | |
| 5,743,216 A | 4/1998 | Holt, Jr. | |
| 5,785,010 A * | 7/1998 | Koch | 119/863 |
| 5,791,295 A | 8/1998 | Schmid et al. | |
| 5,794,571 A | 8/1998 | Goldberg | |
| 5,893,339 A | 4/1999 | Liu | |
| 5,896,831 A * | 4/1999 | Alpert | 119/856 |
| 5,911,200 A * | 6/1999 | Clark | 119/864 |
| 5,915,335 A | 6/1999 | Holt, Jr. | |
| 5,937,794 A | 8/1999 | Hediger | |
| 5,947,062 A | 9/1999 | Hoffman et al. | |
| 5,967,095 A | 10/1999 | Greves | |
| 5,992,352 A | 11/1999 | Borchelt et al. | |
| 6,085,694 A | 7/2000 | Simon | |
| 6,101,979 A | 8/2000 | Wilson et al. | |
| 6,161,505 A * | 12/2000 | Noguero | 119/792 |
| 6,167,844 B1 | 1/2001 | Cantrell et al. | |
| 6,213,057 B1 | 4/2001 | Franco et al. | |
| 6,295,795 B1 | 10/2001 | Ehrmann | |
| 6,314,915 B1 * | 11/2001 | Pope et al. | 119/712 |
| 6,354,247 B1 * | 3/2002 | Andrews | 119/818 |
| 6,367,424 B1 * | 4/2002 | Higham | 119/850 |
| 6,401,666 B1 | 6/2002 | Kircher | |
| 6,427,635 B1 | 8/2002 | Ballard | |
| 6,450,130 B1 * | 9/2002 | Goldberg | 119/792 |
| 6,463,888 B2 | 10/2002 | Clark | |
| 6,564,754 B1 | 5/2003 | Cohen | |
| 6,612,265 B1 * | 9/2003 | Birdsong | 119/856 |
| 6,637,377 B2 | 10/2003 | Lobanoff et al. | |
| D511,596 S | 11/2005 | Mugford | |
| 6,976,453 B2 * | 12/2005 | Goudal | 119/815 |
| 7,107,939 B2 * | 9/2006 | Lady | 119/792 |
| 7,165,511 B1 | 1/2007 | Brezinski | |
| 7,357,099 B2 | 4/2008 | Smith et al. | |
| 2004/0000273 A1 * | 1/2004 | Lady | 119/792 |

FOREIGN PATENT DOCUMENTS

| | | | |
|---|---|---|---|
| DE | 29618168 | * | 12/1996 |
| EP | 1206905 | * | 5/2002 |
| FR | 2301273 | | 9/1976 |
| FR | 2502962 | | 10/1982 |
| GB | 2195224 | * | 4/1988 |
| GB | 2228660 | * | 9/1990 |
| GB | 2201874 | | 9/1998 |
| WO | WO 2005/041645 A1 | | 5/2005 |

* cited by examiner

DOG HARNESS

RELATED APPLICATIONS

This application claims priority of U.S. Provisional Application Ser. No. 60/627,739, filed Nov. 12, 2004.

FIELD OF THE INVENTION

This invention pertains to dog harnesses, more particularly to dog harnesses that allow control of the dog.

BACKGROUND OF THE INVENTION

In modern cities, dogs must be controlled when outside the owner's property and trained to acceptable behavior in any location. Dogs must also be exercised when not allowed to run free, most generally by being taken on walks. Most dogs have collars for attachment to a leash. A rambunctious or energetic dog will pull on a leash, which is unpleasant for the human and can cause dangerous falls. Many collars are available for controlling a dog on walks. The Halti® halter gives some steering power by a strap over the dog's muzzle which, when pulled, turns the dog's head. The Gentle Leader® head collar gives more sophisticated control by allowing simultaneous pressure on the muzzle and the back of the head of the dog, which stimulates natural behavioral signals in the dog.

Harnesses for dogs have been well known for many years and are useful for controlling a dog. In its simplest form, a harness is constructed of one or two straps around the torso at the thorax or belly, connected at to a strap around the chest. The torso strap can be configured to be placed high on the chest and rising to the top of the back. A leash is usually attached at the back. There are several problems with a back attachment. Pressure may be put on sensitive areas of the body, particularly the axial plexus, when the leash is pulled or if the torso strap is too high on the chest. The most limiting problem is that pulling on the leash triggers an opposition reflex. Dogs have evolved to have a reflex causing them to move toward a pressure on their body. A most sensitive point to trigger the opposition reflex is the center of the chest. Therefore, a dog being walked with a harness attached at the back of the neck or shoulders will tend to pull against a leash, causing problems for the handler, including straining the handler's back or injuring the arm due to the dog's strong pull on the leash. A sudden lunge by the dog can result in the handler's falling, especially on slick or icy paths.

SUMMARY OF THE INVENTION

The invention is comprised of at least one torso strap positioned across the lower shoulders of a dog, attached by a first connector to a shoulder strap positioned across the upper shoulders of a dog thereby forming a shoulder-torso circle which encircles the torso of a dog at the xyphoid process of the sternum. At the same first connector the shoulder-torso circle is attached to chest straps at each side of the first connector. Said chest straps are adapted to pass around the front of the chest of a dog just anterior to the top of the sternum, and the end of each chest strap is attached to a limited slip loop near the center of the chest through a second connector. The limited slip loop is securely affixed to a leash connector for attachment of a leash, which leash connector, when pulled, causes the limited slip loop to slide freely through the second connectors in the direction of the pull.

The lengths of the straps are adjusted so that the circle formed by the torso and shoulder straps is adapted to encircle the dog from just anterior to the xyphoid process to the top of the shoulder posterior to the neck and to pass behind the dog's legs. The chest strap with the limited slip loop passes forward at an approximately 90° angle to extend across the front of the lower shoulders and the chest of the dog and passes near the anterior end of the sternum. The chest strap is parallel to the ground when the dog is standing.

In an alternate embodiment, the leash connector is not fixed to the limited slip loop, but is allowed to slide freely along the limited slip loop, the other components of the harness being the same as in the first embodiment.

The preferred embodiment has a wide rectangular first connector at the point where the torso strap attaches to the shoulder strap and the chest strap. The shoulder and torso straps are at close to a 180° angles in respect to each other. The chest strap is attached through the first connector to the shoulder-torso circle at a 90° angle. The preferred embodiment further has an adjustment slide means for adjusting the length of the torso strap, shoulder strap and chest strap and is provided with at least one buckle for opening the circle formed of the torso strap and the shoulder strap. These adjustment slides are preferably placed at each of the first and second connectors and at the buckles. The preferred location of the first buckle is on the shoulder strap. A second buckle may be located on the torso strap. Each buckle may be fitted with an adjustment slide.

A most preferred embodiment has the strap at each point of attachment going through the connector and turning back on itself on the outside of the harness. Likewise, the straps being placed through an adjustment slide are placed on the outside of the harness.

A second torso strap may be attached to the first torso strap through a back strap running along the spine from the first torso strap to the second torso strap or side straps through the first connectors on each side to the second torso strap. This second torso strap is fitted with a third buckle.

DETAILED DESCRIPTION OF THE INVENTION

Figure 1:
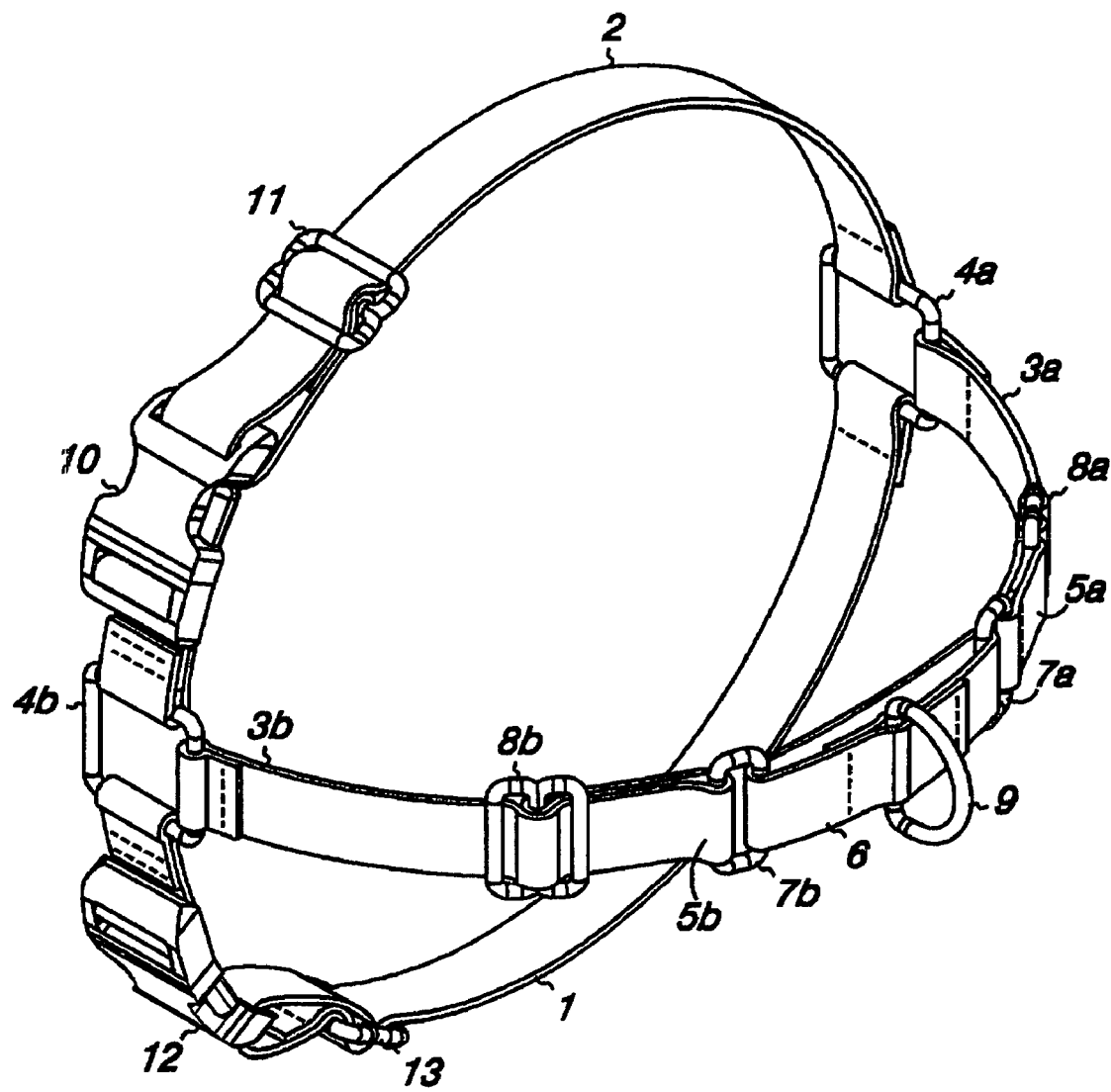
FIG. 1 shows the harness with a leash connector fixed on the limited slip loop.

Various types of ring connectors may be used. A circular ring connector can accommodate a number of straps, which are each free to rotate around the circle. However, the straps may fold or bunch up. A "rectangular connector" is a ring made of a durable material defining a rectangle, to which at least three straps may be attached. A rectangular connector does not permit any change of direction of the straps passing through it and is selected when a fixed angle of attachment is desirable. If two straps are to be attached through a rectangular connector, a narrow rectangular connector is chosen. If three or four straps are to be attached through a rectangular connector, the connector approaches a square. If three straps are to be connected, a triangular connector may be chosen. In describing this invention the "first connector" is the rectangular connector to which the shoulder, torso and chest straps are attached at each side of the harness and the "second connector" is the rectangular connector to which the chest straps are attached.

A half-ring or "D-ring" connector permits rotation on the curved half of the D-ring and does not permit rotation on the flat half of the D-ring. A D-ring is preferred as a leash attachment, with the flat side securely affixed to the limited slip loop. In another embodiment, the D-ring leash connector may not be fixed, but may be able to move freely along the limited slide loop. In either embodiment, when a leash is attached to the semicircular side of the D-ring, the leash may move freely along the semicircle of the leash connector. When the leash is pulled, the pull is transmitted to the leash connector, which slides along the limited slip loop, which then slides through the second connectors in the direction of the pull. In the embodiment in which the D-ring is fixed to the limited slide loop, the loop is pulled away from the chest straps, bringing them closer together and decreasing the diameter of the chest strap, providing a snugging effect.

A "adjustment slide" is a narrow rectangular connector with a center bar. In this invention, the adjustment slide is firmly fixed by the center bar to one strap, while a connecting strap is passed through one side, over the center bar and through the second side. The proportions of the adjustment slide relative to the strap material are such that the connecting strap can be pulled with a firm force through the adjustment slide, but normal movements of the dog will not cause slipping.

A "limited slip" loop is a strap defining a circle and slidably attached at each side to connecting straps. In this invention, the limited slip loop is attached to the two chest straps by a rectangular connector, here termed the second connector, the connector being of a proportion such that the loop can slide easily through the connector. The length of the loop may be any length depending on the overall size of the harness, but is generally from four to twenty inches long; when flattened would be half that length. In general, the flattened loop is of a length to be somewhat shorter than each of the chest straps. The loop is provided with a leash connector, preferably a D-ring. When a leash is attached to the D-ring and pulled, the loop slides through the connectors and is effectively positioned off the center of the chest, to one side of the chest. With its center of gravity and center of balance thus disrupted, the dog will cease its unwanted behavior and will turn in the direction of the pull, that is, to the side.

In describing the placement of the harness, one should notice that the sternum of a dog extends from the front of the dogs to the xyphoid process where the belly begins. The "top of the sternum" refers to the area in the front (chest) of the dog just anterior or above the sternum and rib cage.

Many kinds of releasible connectors are useable in this invention. For convenience, the term "buckle" is used, but any other releasible connector may be substituted without going outside the scope of the attached claims. Illustrated is the preferred buckle, a quick-release buckle, but a standard buckle, hooks or Velcro® fastener may also be used.

Any material may be used for the straps. Webbing is the preferred material because of its comfort and adjustability. It can easily be sewn to securely affix two parts and can be pulled through slide connectors with force and will remain in position. Webbing may be made of nylon, cotton or other materials. The end of a strap pulled through any connector should be turned to the outside of the harness to avoid rubbing on the skin or the dog.

There are many prior art harnesses. Those with the leash connector at the top of the shoulder or the back will transmit pressure to the center of the chest when the dog pulls, triggering the opposition reflex and inducing the dog to pull forward. Those with the leash connector at the chest will have the same problem since when the handler, standing in back or at the side of the dog, pulls the leash, pressure is applied to the center of the dog's chest. The 2004/0000273 application seeks to solve this problem by leaving the torso-shoulder circle loosely fitted so that the leash connector may be pulled off the center to lessen the opposition reflex and steer the dog to one side or the other. However, when the torso-shoulder circle is loose, a pull on the leash causes the leash connector to rise to the neck area (see FIGS. 5 and 6 of the '273 application). Furthermore, the torso-shoulder circle can rotate (FIG. 6 of the '273 application). Thus, the force from the pull is distributed among these torques, with only part of the force directed toward the side.

Applicants have solved the problem of the rotating torso-shoulder circle while retaining the ability to steer the dog to one side or another. The directional pull generated when the limited slip loop is moved to the side causes minimal movement of the harness. Furthermore, the directional pull is significantly greater than the directional pull provided by rotating the entire harness.

The invention is best illustrated by reference to the figures. Turning to FIG. 1, the torso strap 1 is attached to the shoulder strap 2 and two lengths of the chest strap 3a and 3b through first connectors 4a, 4b at each side. Any connector suitable for the attachment of three straps may be used. A round ring connector may be used. A rectangular connector holds the straps in position without allowing any rotation or bunching of the straps as would occur around a ring connector. The far ends of the chest straps 5a and 5b are adjustably attached to the limited slip loop 6 by being passed through rectangular connectors 7a and 7b and secured at adjustment slides 8a and 8b. The straight side of a half-ring (D-ring) connector 9 is securely affixed to the limited slip loop at the point where the loop is closed. A leash may be attached to the half-ring side of the connector 9 and is allowed full movement over the semicircle. A buckle 10 is attached at any point on the shoulder strap to allow the shoulder-torso circle to be opened. A adjustment slide 11 is placed near the buckle 10. A second buckle 12 with adjustment slides 13 may be placed on the torso strap to allow a second point of opening the shoulder-torso circle.

Figure 2:
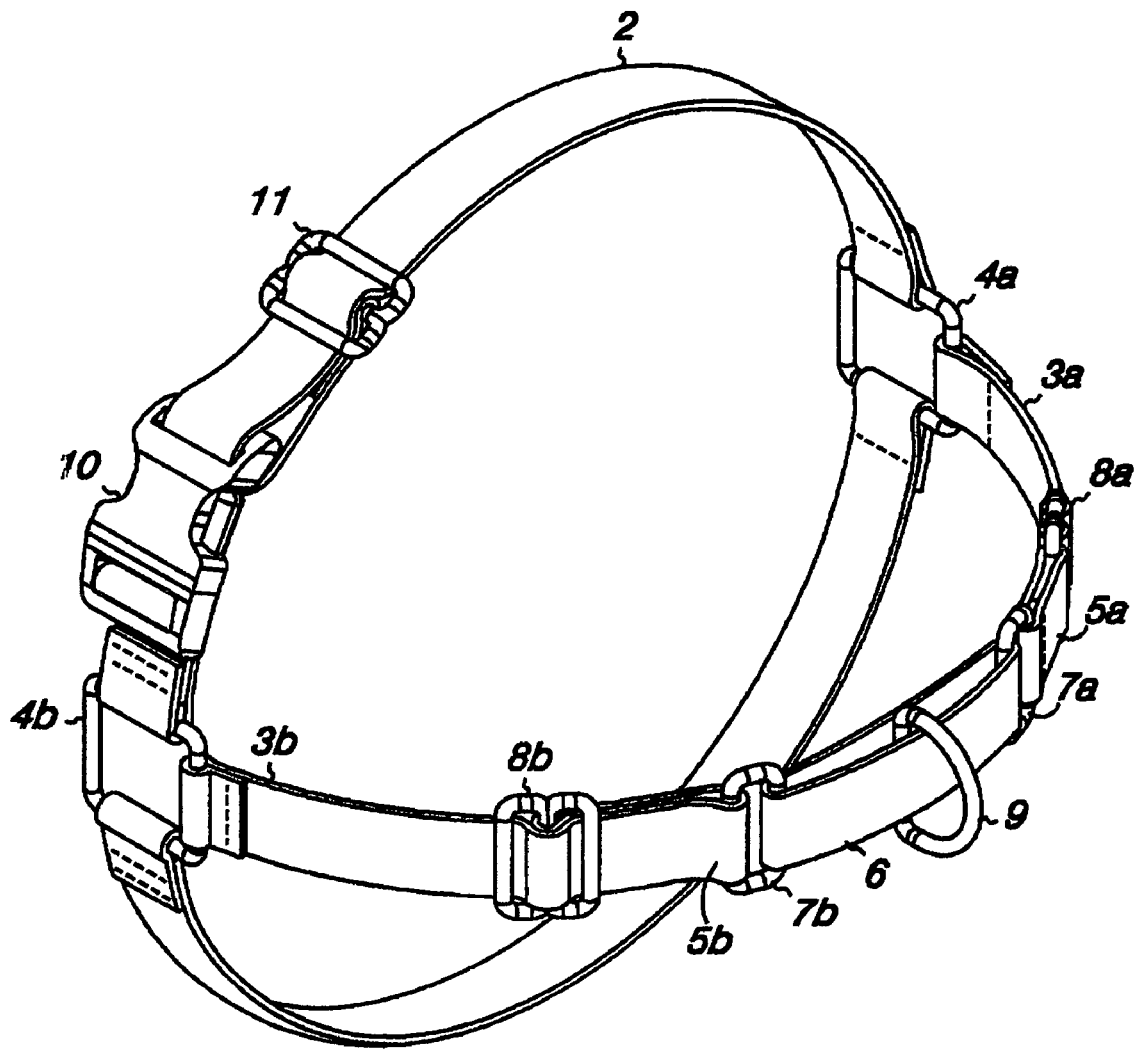
FIG. 2 shows the harness with a leash connector free to slide along the limited slip loop.

Turning to FIG. 2, the torso strap 1 is attached to the shoulder strap 2 and two lengths of the chest strap 3a and 3b through first connectors 4a, 4b at each side. Any connector suitable for the attachment of three straps may be used. A round ring connector may be used. A rectangular connector holds the straps in position without allowing any rotation or bunching of the straps as would occur around a ring connector. The far ends of the chest straps 5a and 5b are adjustably attached to the limited slip loop 6 by being passed through rectangular connectors 7a and 7b and secured at adjustment slides 8a and 8b. The limited slip loop 6 is passed through the D-ring leash connector 9 before the loop is stitched closed. A leash may be attached to the half-ring side of the connector 9 and is allowed full movement over the semicircle. A buckle 10 is attached at any point on the shoulder strap to allow the torso-shoulder circle to be opened. A slide connector 11 is placed near the buckle 10. In this embodiment, the torso buckle is eliminated.

Figure 3A:
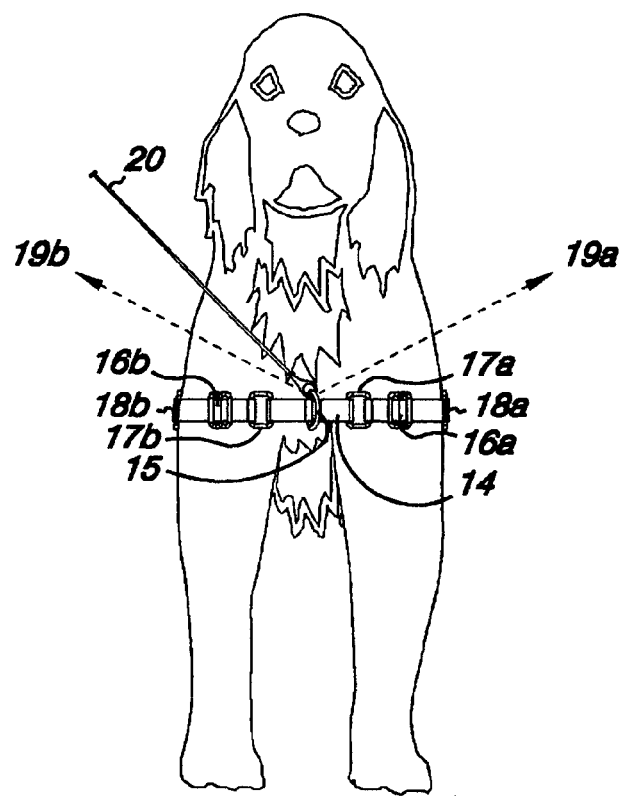
FIG. 3A shows a front view of a dog wearing the harness of the invention.
Figures 3B, 3C:
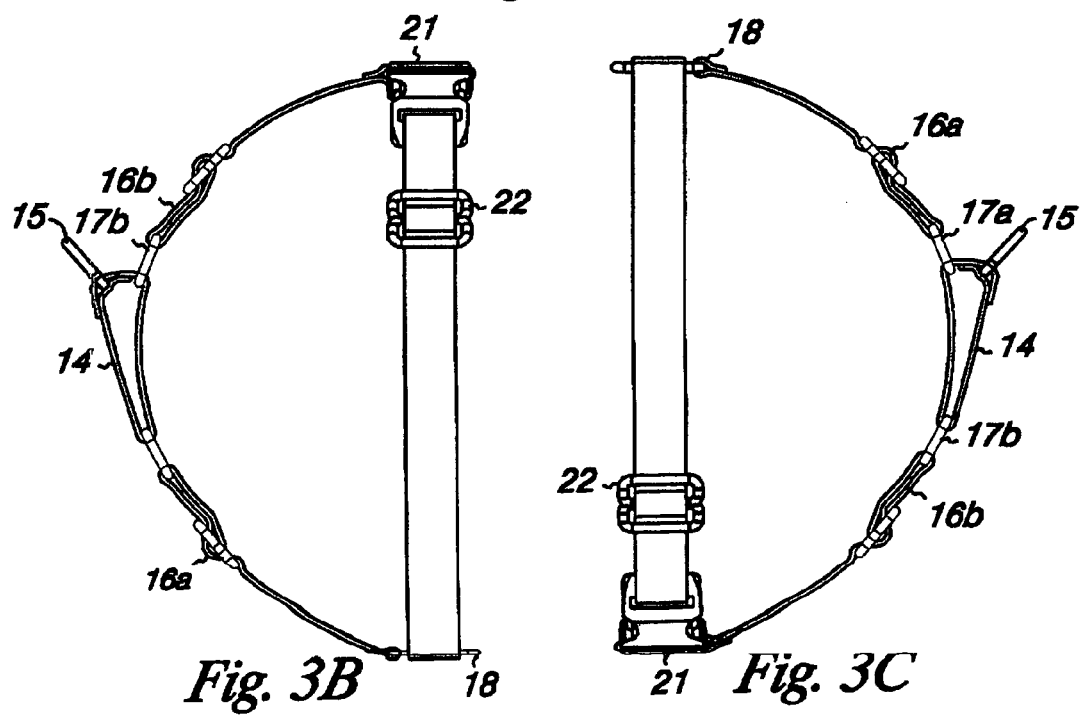
FIG. 3B is a cut-away view from below showing the directional pull generated when the leash is pulled to the right.
FIG. 3C is a cut-away view from below showing the directional pull generated when the leash if pulled to the left.

FIG. 3A shows a front view of the harness on a dog, with limited slip loop 14 and the leash connector 15 in a relaxed position, chest straps 16a and 16b, second connectors 17a and 17b, and the leash 20, ready to be pulled to the left or to the right. As can be seen in FIG. 3, the directional pulls, 19 a and 19 b are greater on the chest straps 16a and 16b on the opposite side from the directional pull. FIG. 3B is a top cut-away view looking upward from the torso strap 22 with buckle 21, showing the position of the leash connector 15 and limited slide loop 14 when the leash is pulled from the left side of the dog; showing that the directional pull 19a is greater on the right chest strap 16a and more relaxed on the left chest strap 16b; conversely, as in Figure C, when the leash is pulled from the right side of the dog, directional pull 19b is greater on the left chest strap 16b and more relaxed on the right chest strap 16a. In either case, if the leash connector 15 is fixed to the limited slide loop 14, the limited slide loop is shortened and the overall effect on the dog is a snugging of the fit, which contributes to the controlling effect.

Figure 4:
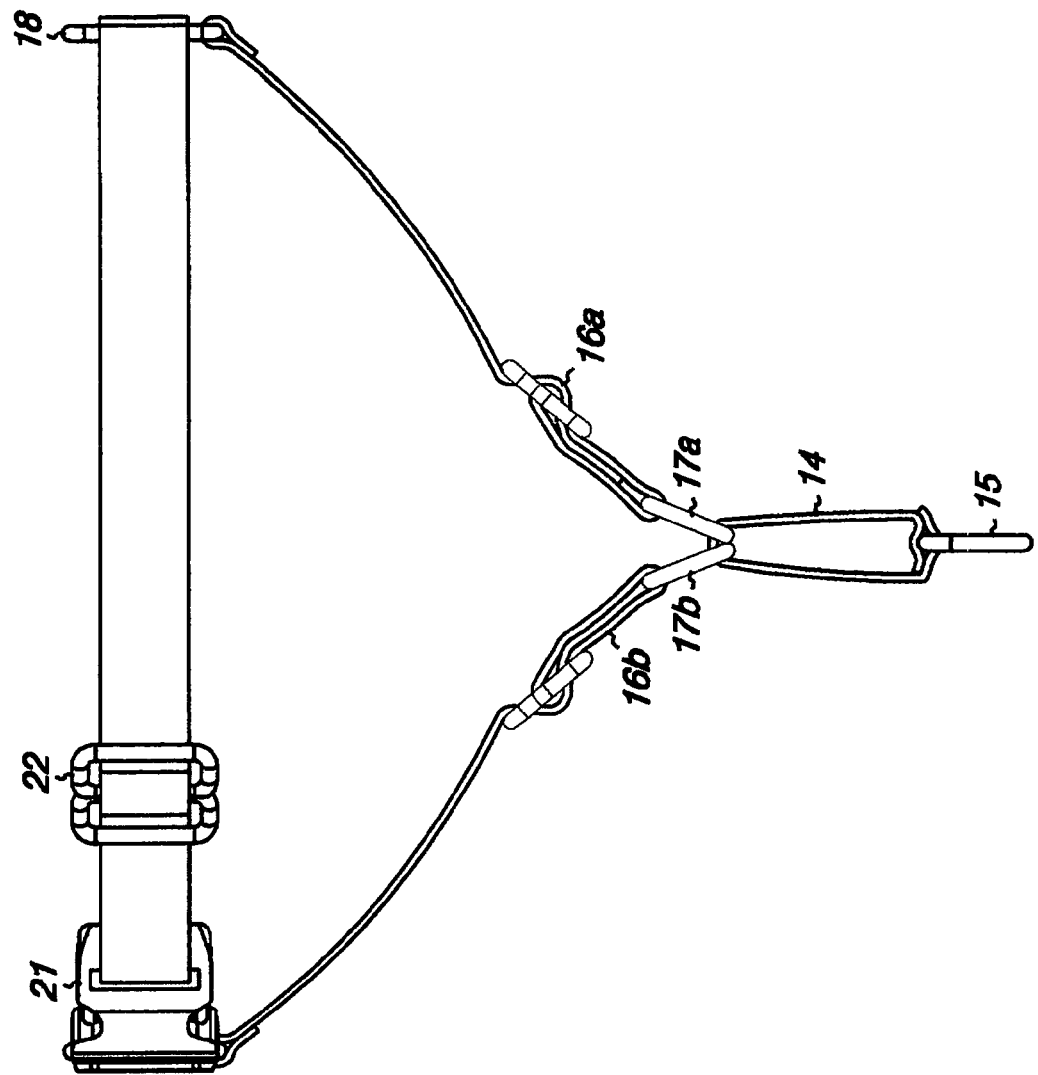
FIG. 4 is a cut-away view from below showing the snugging of the chest strap when the leash is pulled to the front.

FIG. 4 shows an additional benefit of the harness. This view looks upward through the torso strap 22 with buckle 21 and first connector 18. When a dog is stationary, but becomes agitated or upset, the handler pulls on the leash, the pull is transmitted to the leash connector 15, then to the limited slip loop 14, through the second connectors 17a and 17b causing the chest straps 16 a and 16b to move closer toward each other, thus snugging and calming the dog.

Figure 5:
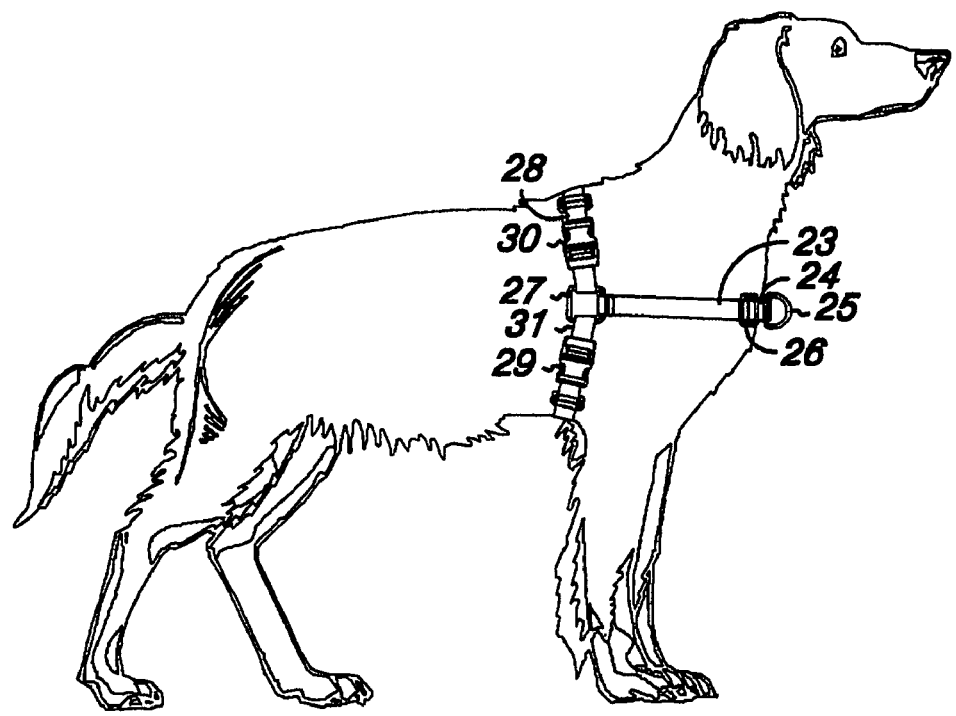
FIG. 5 is a side view of a dog in the harness.
Figure 6:
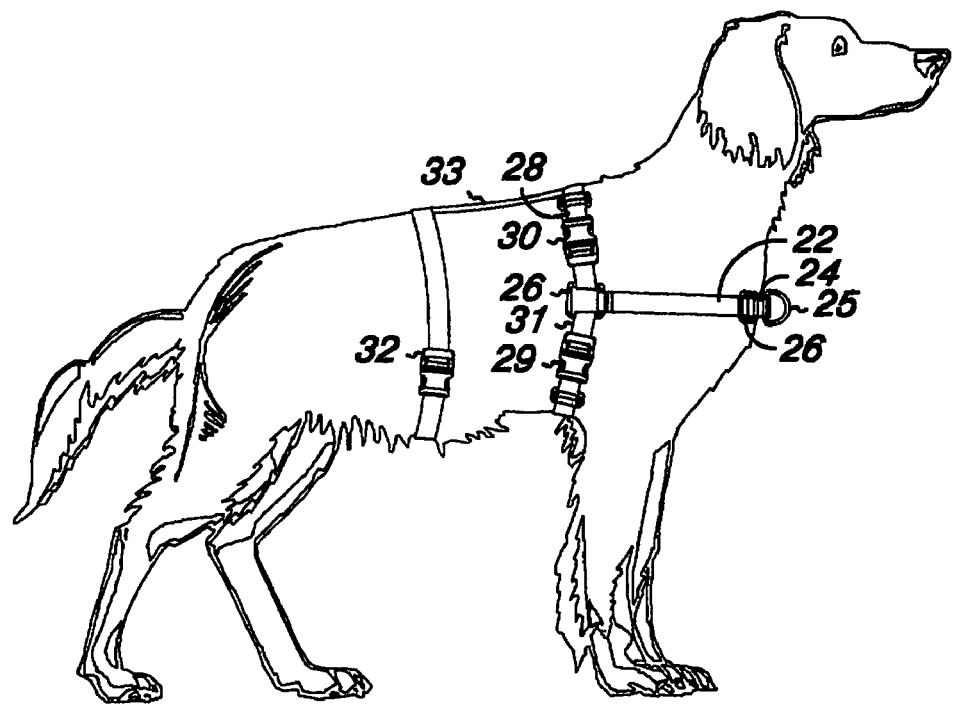
FIG. 6 is a side view of a dog in the harness, the harness having two torso straps.

FIG. 5 shows a side view of a dog wearing the harness, showing the exact placement of the parts of the harness for maximum utility. The chest strap 23 is connected to the limited slip loop 24 through the second connector 26. The leash connector 25 may be fixed or loose. The shoulder strap 28 is provided with a first buckle 30 and is attached through the first connector 27 to the chest strap 23 and the torso strap 31. The shoulder-torso circle has been adjusted in diameter so that when the chest strap is attached at a 90° angle, the chest strap extends across the front of the dog's chest at the top of the sternum and is parallel to the ground when the dog is standing. In this embodiment, a second buckle 29 is provided on the torso strap.

Figure 7:
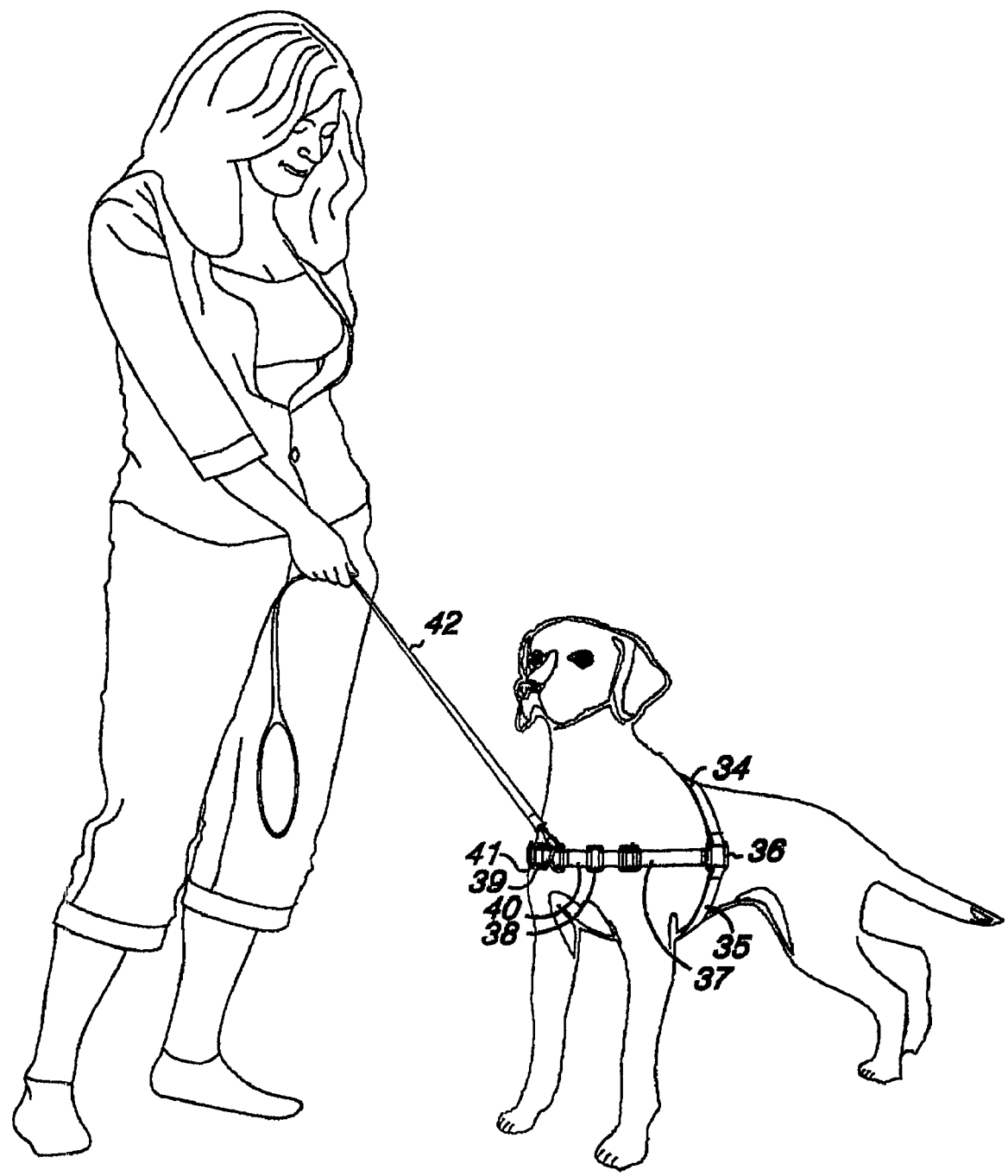
FIG. 7 shows a handler pulling the leash attached to the leash connector to the right of the dog.

FIG. 6 shows a side view of a dog wearing a harness fitted with two torso straps. The chest strap 23 is connected to the limited slip loop 24 through the second connector 26. The shoulder-torso circle has been adjusted in diameter so that when the chest strap is attached at a 90° angle, the chest strap extends across the front of the dog's chest at the top of the sternum and is parallel to the ground when the dog is standing. In this embodiment, a second buckle 29 is provided on the torso strap. The leash connector 25 may be fixed or loose. The shoulder strap 28 is provided with a first buckle 30 and is attached through the first connector 27 to the chest strap 23 and the torso strap 31. In this embodiment, a second buckle 29 is provided on the torso strap. The second torso strap 32 is connected to the first torso strap through a strap 33. In this embodiment, one strap 33 is placed at the top of the spine. It is understood that connecting straps between the first torso strap and the second torso strap may be placed at any position between the two torso straps FIG. 7 is a three-quarter view of a dog wearing the harness with shoulder strap 34 connected through the first connector 36 to the torso strap 35 and the chest strap 37. The chest strap 37 and attached through a second connector 38 to the limited slip loop 40 which moves toward the right of the dog 41 as the handler pulls on the leash 42. There is no rotation of the harness.

Before use, the harness must be carefully fitted to the dog in order to give a comfortable, but snug, fit that will not shift or rotate. It is to be understood that the harness may be fitted by shortening each strap at any adjustment slide. The following instructions apply to the preferred harness of FIG. 1, but may be modified to fit any model.

Open the quick snap buckle on the torso strap.
Place the shoulder strap over the dog's head with the chest strap resting on the dog's chest.
Place the torso strap just anterior to the xyphoid process of the sternum and tighten the torso strap to a comfortably snug fit. On medium-sized dogs, allow room for about a finger's width under the strap. Allow a bit more for larger dogs and less for smaller dogs.
Gently press fingers on the lower front of the dog's chest to locate the sternum (breastbone).
Adjust the shoulder strap so that when the chest strap is horizontal (parallel to the ground), the chest strap rests directly over the top of the sternum. The shoulder strap will form a 90° angle with the chest strap.
After the shoulder and the torso straps have been tightened to allow only about a finger's width under the strap, adjust the chest strap to fit securely. It should rest nearly parallel to the ground and not hang down or pull the torso-shoulder circle far forward.

When the adjustment is optimal, the shoulder-torso circle will be nearly a perfect circle, with only a slight deviation toward the chest strap. It is important to check and adjust the fit according to the instructions above as the dog grows or changes weight.

In use, the harness is opened by releasing a buckle and fitted on the dog. As a handler walks the dog, when the dog pulls or it is desired to turn the dog's direction or attention to the side, the handler will pull on the leash to the left or to the right, transmitting the pull through the D-ring to the limited slip loop, which will slide in the direction of the pull, changing the dog's center of gravity and affecting the dog's balance. The dog is shifted off balance and halts its response to the opposition reflex. If the dog resists the pull, its center of gravity is compromised, causing it to break pace and giving it an uncomfortable, but not painful, feeling of being off-balance. The dog will naturally and easily turn in the direction of the handler's pull. As the dog becomes habituated to the use of the harness, it automatically avoids the off-balance feeling by accepting the behavioral signal of the leash pull and turning automatically in the desired direction.

When properly fitted, the harness will rotate minimally or not at all out of position.

It is to be understood that the possible combinations of embodiments include:
A first and second buckle on the shoulder and torso straps with a fixed leash connector;
A first and second buckle on the shoulder and torso straps with a free moveable leash connector;
A single buckle on the shoulder strap with either a fixed or free leash connector;
A single buckle on the torso strap with either a fixed or free leash connector;
Any of the above embodiments with a second torso strap connected to the first torso strap by a back strap.

Those skilled in the art can readily make insubstantial modifications and additions to the harness of this invention, which modifications and additions are within the scope of the appended claims.

We claim:
1. A dog harness comprising:
a first torso-encircling strap dimensioned and configured to extend around the torso of a dog;

a plurality of first connectors each coupled to the first torso-encircling strap; and a chest strap adapted for positioning across the chest of the dog anterior to the dog's sternum and coupled to said first connectors, said chest strap comprising:

a first length defining a first connecting strap having a posterior end coupled to one of said first connectors, and a far end, a second length separate and spaced apart from said first length and defining a second connecting strap having a posterior end coupled to another of said first connectors, and a far end, first and second anterior connectors respectively coupled to the to the far ends of said first and second connecting straps, and a endless loop of a selected length, separate and discrete from said first and second lengths and having an attachment member adapted for coupling to a leash, said endless loop extending through and slidably received by each of said first and second anterior connectors whereby a pulling force applied to said attachment member causes shifting of said endless loop relative to said anterior connectors, said attachment member comprising a ring retained on said loop and with a portion of the loop extending through said ring.

2. A dog harness as set forth in claim 1, wherein said first torso-encircling strap includes a shoulder strap and a torso strap separate from said shoulder strap, said shoulder strap and said torso strap being connected by said first connectors, at least one of said shoulder strap and torso strap including a slip-resistant adjustment member for selectively adjusting the length of said one of said shoulder strap and torso strap.

3. A dog harness as set forth in claim 2, wherein at least one of said shoulder strap and torso strap includes a releaseable connector.

4. A dog harness as set forth in claim 2, wherein said first connectors are separate from and interconnect said torso strap, said shoulder strap and respectively the posterior ends of each of said first and second lengths for inhibiting transverse movement of the posterior ends of said first and second lengths relative to said torso strap and said shoulder strap.

5. A dog harness as set forth in claim 4, wherein said first and second lengths each include adjustment members for adjustment of the first and second lengths independent of one another.

6. A dog harness as set forth in claim 4, wherein the attachment member is fixed to the endless loop.

7. A dog harness as set forth in claim 1, further including a second torso-encircling strap positioned posterior to said first torso-encircling strap and a strap connecting said second torso-encircling strap to said first torso-encircling strap.

8. A dog harness as set forth in claim 1, further comprising at least one buckle on one of the first and second connecting straps of the chest strap.

\* \* \* \* \*